(12) United States Patent
Lee et al.

(10) Patent No.: US 11,140,816 B2
(45) Date of Patent: Oct. 12, 2021

(54) MOWING ROBOT

(71) Applicant: LG ELECTRONICS INC., Seoul (KR)

(72) Inventors: Jaehoon Lee, Seoul (KR); Seungin Shin, Seoul (KR); Jaehoon Jeong, Seoul (KR)

(73) Assignee: LG ELECTRONICS INC., Seoul (KR)

(*) Notice: Subject to any disclaimer, the term of this patent is extended or adjusted under 35 U.S.C. 154(b) by 323 days.

(21) Appl. No.: 16/251,957

(22) Filed: Jan. 18, 2019

(65) Prior Publication Data

US 2019/0223376 A1    Jul. 25, 2019

(30) Foreign Application Priority Data

Jan. 19, 2018   (KR) ........................ 10-2018-0007091

(51) Int. Cl.
| | | |
|---|---|---|
| *A01D 34/00* | (2006.01) | |
| *A01D 34/58* | (2006.01) | |
| *B25J 13/08* | (2006.01) | |
| *A01D 101/00* | (2006.01) | |

(52) U.S. Cl.
CPC ......... *A01D 34/008* (2013.01); *A01D 34/001* (2013.01); *A01D 34/58* (2013.01); *B25J 13/088* (2013.01); *A01D 2101/00* (2013.01)

(58) Field of Classification Search
CPC .... A01D 34/008; A01D 34/001; A01D 34/58; A01D 2101/00
See application file for complete search history.

(56) References Cited

U.S. PATENT DOCUMENTS

| | | |
|---|---|---|
| 2017/0270369 A1 | 9/2017 | Shiromizu et al. |
| 2017/0280623 A1 | 10/2017 | Yamamura et al. |
| 2018/0116109 A1* | 5/2018 | Matsumoto .......... A01D 34/008 |
| 2018/0184586 A1* | 7/2018 | Song ..................... A01D 34/81 |

(Continued)

FOREIGN PATENT DOCUMENTS

| | | |
|---|---|---|
| DE | 10 2014 226 436 | 6/2016 |
| EP | 3 225 094 | 10/2017 |

(Continued)

OTHER PUBLICATIONS

Korean Notice of Allowance dated May 3, 2019 issued in KR Application No. 10-2018-0007091.

(Continued)

*Primary Examiner* — Abigail A Risic
(74) *Attorney, Agent, or Firm* — KED & Associates LLP

(57) ABSTRACT

A mowing robot includes a body which forms an outer shape and an internal space; a first wheel and a second wheel which are independently rotatably provided at a first side and a second side respectively so that the body can rotate and move forward with respect to ground; a first motor which provides a rotational force to the first wheel; a second motor which provides a rotational force to the second wheel; and a sensor which is provided in the internal space, has a gyro sensing function for at least horizontal rotation, and has a magnetic field sensing function, wherein the sensor is provided between a wheel front end plane and a wheel rear end plane, and is provided above a first motor upper end plane and a second motor upper end plane.

20 Claims, 9 Drawing Sheets

(56) References Cited

U.S. PATENT DOCUMENTS

| | | | | |
|---|---|---|---|---|
| 2018/0271014 A1* | 9/2018 | Matsuzawa | ............ | A01D 34/008 |
| 2019/0310641 A1* | 10/2019 | Matsuzawa | ............ | B62D 24/04 |
| 2019/0364727 A1* | 12/2019 | Yamada | ............ | A01D 34/84 |
| 2019/0384287 A1* | 12/2019 | Hyakusawa | ............ | G06F 3/04845 |
| 2021/0000009 A1* | 1/2021 | Yu | ............ | A01D 34/008 |

FOREIGN PATENT DOCUMENTS

| | | |
|---|---|---|
| EP | 3 226 207 | 10/2017 |
| JP | 2012-235712 | 12/2012 |
| JP | 2016-208886 | 12/2016 |
| KR | 10-2015-0125508 | 11/2015 |
| KR | 10-2015-0133079 | 11/2015 |
| KR | 10-2017-0123927 | 11/2017 |
| KR | 10-2017-0134093 | 12/2017 |

OTHER PUBLICATIONS

European Search Report dated May 22, 2019 issued in EP Application No. 19152518.7.

* cited by examiner

MOWING ROBOT

CROSS-REFERENCE TO RELATED APPLICATION

This application claims priority under 35 U.S.C. § 119 to Korean Application No. 10-2018-0007091 filed on Jan. 19, 2018, whose entire disclosure is hereby incorporated by reference.

BACKGROUND

1. Field

The present disclosure relates to a sensor disposition structure of a robot.

2. Background

Robots have been developed for industrial use and have been part of factory automation. The application field of robots has been expanded such that medical robots, aerospace robots, and the like have been developed and household robots that can be used in ordinary homes have also been developed. Among these robots, a robot capable of traveling by itself may be called a mobile robot. An example of a mobile robot used in an outdoor environment of a home may be a mowing robot.

Generally, a mowing device may include a riding type device which mows the lawn by a user who rides the device while moving according to the user's driving, a work-behind type device or a hand type device which a user pulls or pushes to mow the lawn, and the above mentioned mowing robot which can accomplish an autonomous driving. In the case of a mobile robot that autonomously travels indoors, a movable area may be restricted by a wall, furniture, or the like. However, in the case of the mowing robot that autonomously travels outdoors, the movable area may need to be previously set. In addition, the movable area may need to be restricted so that the mowing robot can travel in the area where lawns are planted.

In the related art (Korean Patent Laid-Open Publication No. 2015-0125508), a wire is laid to set an area where the mowing robot moves, and the mowing robot senses a magnetic field formed by a current flowing in the wire to move in the area set by the wire. In addition, the mowing robot of the related art may include a sensor for sensing the result of autonomous driving. For example, a gyro sensor and an acceleration sensor may be used to detect an autonomous travel path of the mowing robot, and the like.

The above reference is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
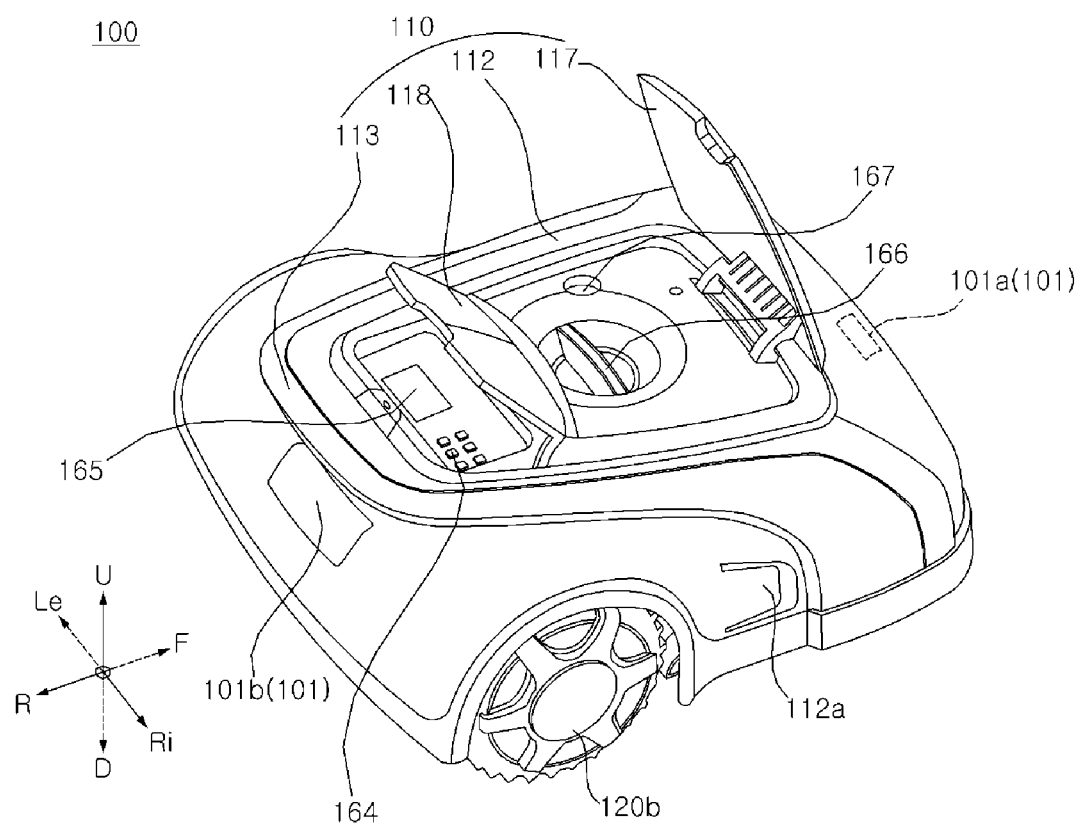
FIG. 1 is a perspective view of a mowing robot 100 according to an embodiment of the present disclosure.

Referring to FIG. 1 and FIG. 3 to FIG. 9, a mowing robot 100 may include a body 110 which forms an external shape. The body 110 may form an internal space. The mowing robot 100 may include a driving wheel unit or driving wheel 120 which moves the body 110 with respect to the ground (traveling surface). The driving wheel 120 may include a first wheel 120a and a second wheel 120b which are independently rotatably provided at the left and right sides respectively.

The mowing robot 100 may include a driving motor module or driving motor 130 which provides a rotational force to the driving wheel 120. The driving motor 130 may include a first motor 130a which provides the rotational force to the first wheel 120a and a second motor 130b which provides the rotational force to the second wheel 120b. The first motor 130a may be provided on the left side of the second motor 130b.

The mowing robot 100 may include a blade 140 rotatably provided to mow the grass. The mowing robot 100 may include a blade motor 150 that provides the rotational force to the blade 140. The mowing robot 100 may include a battery Bt that supplies power to the driving motor module 130. The battery Bt may supply power to the blade motor 150.

The mowing robot 100 may include a sensor 170 provided in the internal space of the body 110. The sensor 170 may have a gyro sensing function and a magnetic field sensing function. The sensor 170 may further include an acceleration sensing function.

Referring to FIG. 6 to FIG. 9, the first wheel 120a may rotate on a virtual wheel axis Ow extending laterally. The second wheel 120b may also rotate on the wheel axis Ow. However, the present disclosure is not necessarily limited thereto. The rotation axis of the first wheel and the rotation axis of the second wheel may be crossed each other at an angle. Alternatively, the rotation axis of the first wheel and the rotation axis of the second wheel may be provided to be changeable according to the movement control of the mowing robot.

A virtual straight line connecting the center of the first wheel 120a and the center of the second wheel 120b may correspond to the wheel axis Ow. Alternatively, the virtual straight line connecting the center of the first wheel 120a and the center of the second wheel 120b may be different from the rotation axis of the first wheel 120a and may be different from the rotation axis of the second wheel 120b.

The wheel axis Ow may be a virtual axis that describes the position of the rotation axis of the first wheel 120a and the second wheel 120b, and may not refer to an actual component such as a shaft. In order to rotate the first wheel 120a and the second wheel 120b based on the wheel axis Ow, the first wheel 120a and the second wheel 120b may be directly connected to the rotation axis of the first motor 130a and the rotation axis of the second motor 130b, respectively. Alternatively, a component such as a shaft may be connected to the first wheel 120a and the second wheel 120b, and the rotational force of the motor 130a, 130b may be transmitted to the wheel 120a, 120b, respectively, by a gear, a chain, or the like.

Referring to FIG. 6 to FIG. 9, virtual planes for describing the configuration of the present disclosure are defined as follows. The following virtual planes V1, V2, V3, V4a, V4b, V5a, V5b, H1a, H1b, H2, H3 do not refer to an actual component or an actual plane. Here, the vertically disposed plane means a plane parallel to the axes U and D in the up and down direction, and the horizontally disposed plane means a plane parallel to the axes F and R in the front and rear direction and the axes Le and Ri in the left and right direction.

A virtual wheel axis plane V1 which is vertically disposed while passing through the center of the first wheel 120a and the center of the second wheel 120b may be defined. The wheel axis plane V1 may be a plane including the wheel axis Ow. A virtual blade motor rear end plane V2 which is in contact with the rear R end of the blade motor 150 and is vertically arranged may be defined. A virtual battery front-end plane V3 which is in contact with the front F end of the battery Bt and is vertically arranged may be defined.

A virtual wheel front end plane V4a which is in contact with the front end of the first wheel 120a and the front end of the second wheel 120b and is vertically arranged may be defined. A virtual wheel rear end plane V4b which is in contact with the rear end of the first wheel 120a and the rear end of the second wheel 120b and is vertically arranged may be defined. A virtual first motor right end plane V5a which is in contact with the right Ri end of the first motor 130a and is vertically arranged may be defined. A virtual second motor left end plane V5b which is in contact with the left Le end of the second motor 130b and is vertically arranged may be defined.

A virtual first motor upper end plane H1a which is in contact with the upper U end of the first motor 130a and is horizontally arranged may be defined. A virtual second motor upper end plane H1b which is in contact with the upper U end of the second motor 130b and is horizontally arranged may be defined. The first motor upper end plane H1a and the second motor upper end plane H1b may be coplanar. The driving motor upper end planes H1a and H1b which are in contact with the upper end of the driving motor module 130 and horizontally arranged may be defined. A virtual blade motor upper end plane H2 which is in contact with the upper end of the blade motor 150 and is horizontally arranged may be defined. A virtual battery upper end plane H3 which is in contact with the upper end of the battery Bt and is horizontally arranged may be defined.

Referring to FIG. 1 and FIG. 3 to FIG. 5, the mowing robot 100 may include an obstacle detection unit (or obstacle detecting sensor) 161 that detects an obstacle ahead. A plurality of obstacle detection units (or obstacle detecting sensors) 161a, 161b, and 161c may be provided. The obstacle detecting sensor 161 may be provided at a front of the body 110. The obstacle detecting sensor 161 may be provided at an upper side of a frame 111.

The mowing robot 100 may include a rain detection unit (or rain detecting sensor) for sensing rain. The rain detecting sensor may be provided in a case 112. A lane detection unit (or lane detecting sensor) may be provided at the upper side of the frame 111.

The mowing robot 100 may include a remote signal reception unit (or remote signal receptor) 101 that receives an external remote signal. When a remote signal from an external remote controller is transmitted, the remote signal receptor 101 may receive the remote signal. For example, the remote signal may be an infrared signal. A signal received by the remote signal receptor 101 may be processed by a controller 163.

A plurality of remote signal receptors 101 may be provided. The plurality of remote signal receptors 101 may include a first remote signal receptor 101a provided at a front portion of the body 110 and a second remote signal receptor 101b provided at a rear portion of the body 110. The first remote signal receptor 101a may receive a remote signal transmitted from the front. The second remote signal receptor 101b may receive a remote signal transmitted from the rear.

The mowing robot 100 may include an auxiliary wheel 162 provided at front of the first wheel 120a and the second wheel 120b. The auxiliary wheel 162 may be located in front of the blade 140. The auxiliary wheel 162 may be a wheel that does not receive a driving force by the motor, and may supplementally support the body 110 with respect to the ground. A caster 107 supporting the rotation axis of the auxiliary wheel 162 may be rotatably coupled to the frame 111 with respect to a vertical axis. A first auxiliary wheel 162a provided at the left side and a second auxiliary wheel 162b provided at the right side may be provided.

The mowing robot 100 may include an input unit (or input) 164 that allows a user to input various instructions. The input 164 may include a button, a dial, or a touch-type display, for example. The input 164 may include a microphone for voice recognition. A plurality of buttons may be provided at the upper side of the case 112.

The mowing robot 100 may include an output unit (or display) 165 that displays various information to the user. The display 165 may include a display module 165 that outputs visual information. The display 165 may include a speaker that outputs auditory information.

The display module 165 may output an image in the upward direction. The display module 165 may be provided in the upper side of the case 112. For example, the display module 165 may include a thin film transistor liquid crystal display (LCD) panel. In addition, the display module 165 may be implemented by using various display panels such as a plasma display panel or an organic light emitting diode display panel.

The mowing robot 100 may include a communication unit for communicating with an external device (terminal, etc.), a server, a router, and the like. The communication unit may vary depending on the communication method of other device or a server to communicate with.

The mowing robot 100 may be able to change the height of the blade 140 with respect to the ground so that the lawn mowing height can be changed. The mowing robot 100 may include a height adjustment unit or knob 166 that may allow a user to change the height of the blade 140. The height adjustment knob 166 may include a rotatable dial, and the height of the blade 140 may be changed by rotating the dial.

The mowing robot 100 may include a height display unit (or height display) 167 that displays the height level of the blade 140. When the height of the blade 140 is changed according to the operation of the height adjustment knob 166, the height level displayed by the height display 167 may also be changed. For example, the height display 167 may display a lawn height value which is estimated after the lawn mower robot 100 performs lawn mowing with a current height of the blade 140.

The mowing robot 100 may include a global positioning system (GPS) board 168 which may detect a global positioning system (GPS) signal. The GPS board 168 may be a PCB. The mowing robot 100 may include a docking insertion unit or cavity 169 which is connected to a docking equipment (or dock) 200 when docked to the dock 200. The docking insertion cavity 169 may be recessed to receive a docking connection unit (or docking connector) 210 of the dock 200. The docking insertion cavity 169 may be provided in the front portion of the body 110. Due to the connection between the docking insertion cavity 169 and the docking connector 210, a correct position can be guided when the mowing robot 100 is charged.

The mowing robot 100 may include a charging corresponding terminal 102 provided in a position which can be in contact with a charging terminal 211 described later, in a state where the docking insertion cavity 169 is inserted into the docking connector 210. The charging corresponding terminal 102 may include a pair of charging corresponding terminals 102a and 102b that correspond to a pair of charging terminals 211a and 211b. The pair of charging corresponding terminals 102a, 102b may be arranged laterally with the docking insertion cavity 169 therebetween.

A terminal cover that covers the docking insertion cavity 169 and the pair of charging terminals 211a and 211b to be able to open and close the docking insertion cavity 169 may be provided. When the mowing robot 100 travels, the terminal cover may cover the docking insertion cavity 169 and the pair of charging terminals 211a and 211b. When the mowing robot 100 is connected to the dock 200, the terminal cover may be opened to expose the docking insertion cavity 169 and the pair of charging terminals 211a and 211b.

The mowing robot 100 may include the controller 163 that controls autonomous driving. The controller 163 may process a signal of the obstacle detection sensor 161. The controller 163 may process a signal of the GPS board 168. The controller 163 may process a signal of the sensor 170. The controller 163 may process a signal of the input 164.

The controller 163 may control driving of the first motor 130a and the second motor 130b. The controller 163 may control driving of the blade motor 150. The controller 163 may control the output of the display 165. The controller 163 may include a main board 163 provided in the internal space of the body 110. The main board 163 may be a PCB.

Figure 2:
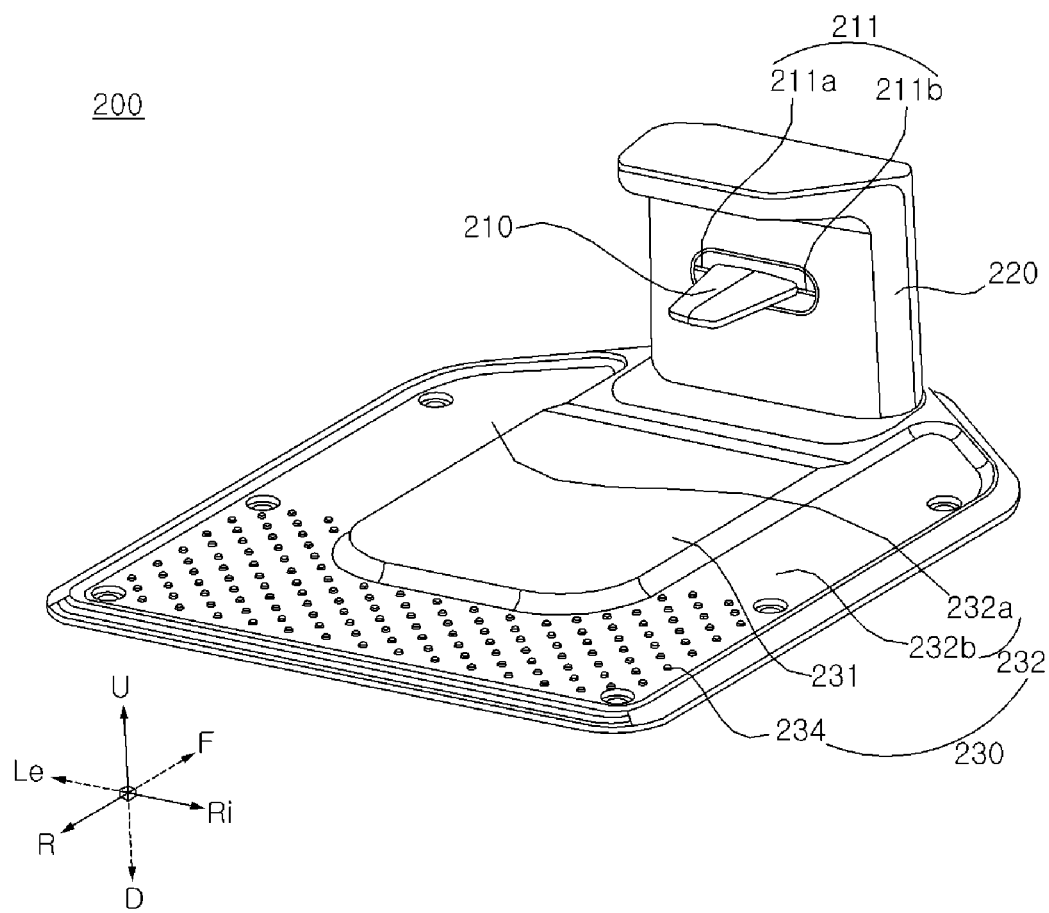
FIG. 2 is a perspective view showing a docking equipment 200 docking the mowing robot 100 of FIG. 1.
Figure 3:
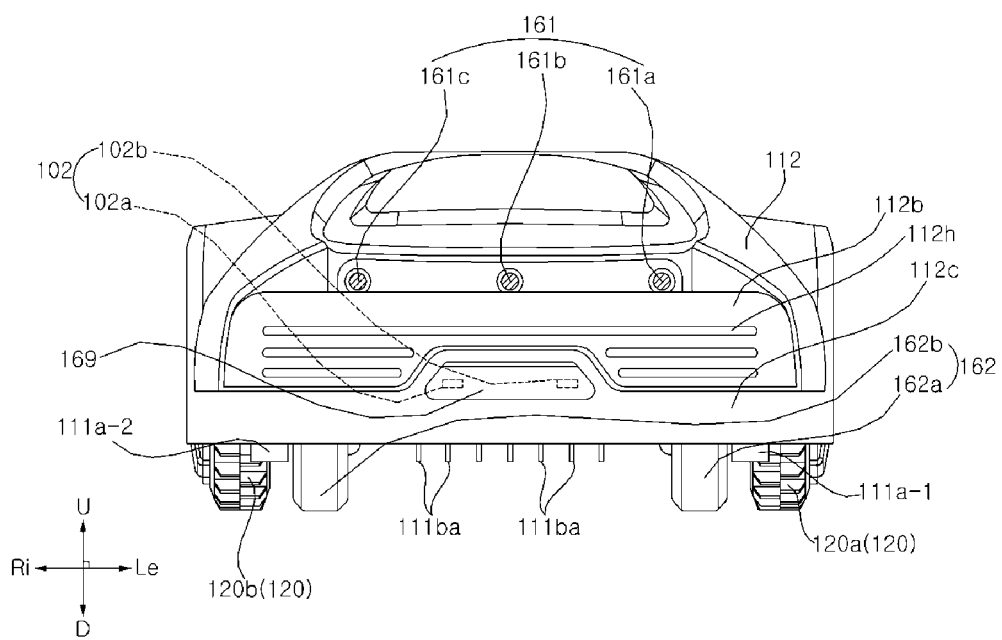
FIG. 3 is a front elevation of the mowing robot 100 of FIG. 1.
Figure 4:
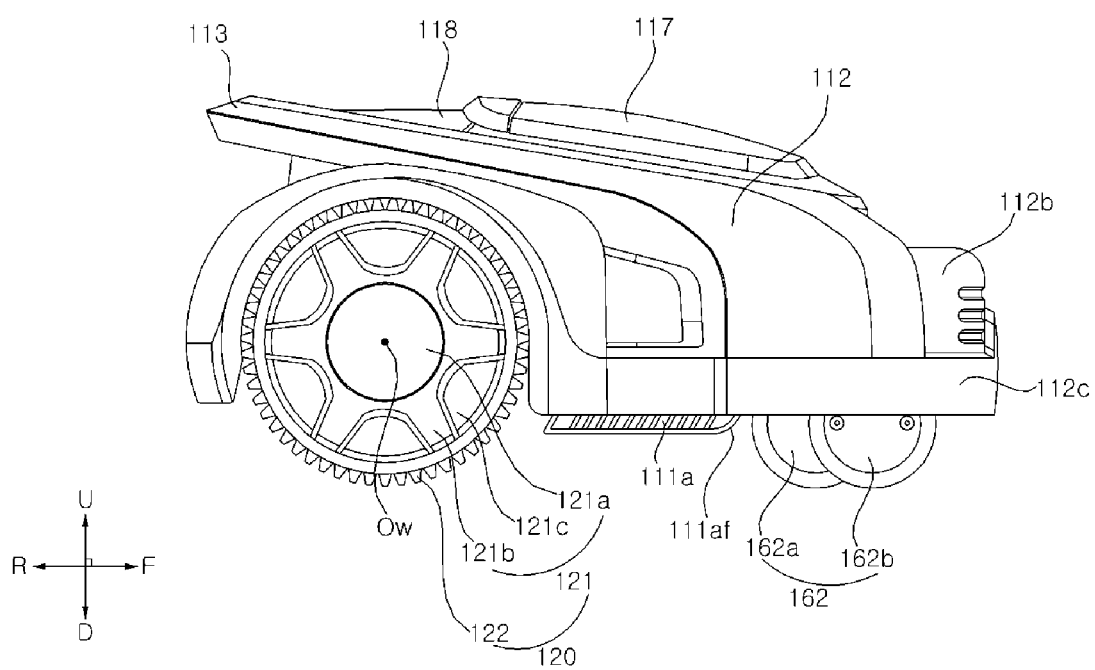
FIG. 4 is an elevational view of a right side of the mowing robot 100 of FIG. 1.

Referring to FIG. 2, the dock 200 may include a docking base 230 provided as the floor and a docking support unit or tower 220 that protrudes upward from a front portion of the docking base 230. In addition, it may include the docking connector 210 that is inserted into the docking insertion cavity 169 during the charging of the mowing robot 100. The docking connector 210 may protrude rearward from the docking support tower 220.

The thickness in a vertical direction of the docking connector 210 may be smaller than a horizontal width of the docking connector 210. The horizontal width of the docking connector 210 may be narrowed toward the rear side. As viewed from above, the docking connector 210 may be generally trapezoidal.

The docking connector 210 may have a symmetrical shape. A rear portion of the docking connector 210 may form a free end and the front portion of the docking connector 210 may be fixed to the docking support tower 220. The rear portion of the docking connector 210 may be rounded. When the docking connector 210 is completely inserted into the docking insertion cavity 169, the mowing robot 100 may be charged by the dock 200.

The dock 200 may include a charging terminal 211 that charges the mowing robot 100. The charging terminal 211 and the charging corresponding terminal 102 of the mowing robot 100 may be in contact with each other, so that a power may be supplied from the dock 200 to the mowing robot 100.

The charging terminal 211 may include a contact surface facing the rear side, and the charging corresponding terminal 102 may include a contact corresponding surface facing the front. The contact surface of the charging terminal 211 and the contact corresponding surface of the charging corresponding terminal 102 may be in contact with each other, so that the power of the dock 200 may be connected to the mowing robot 100.

The charging terminal 211 may include a pair of charging terminals 211a and 211b which form a positive terminal and a negative terminal. The first charging terminal 211a may be in contact with a first charging corresponding terminal 102a, and the second charging terminal 211b may be in contact with a second charging corresponding terminal 102b.

The pair of charging terminals 211a and 211b may be arranged with the docking connector 210 interposed therebetween. The pair of charging terminals 211a and 211b may be arranged to the left and right of the docking connection unit 210, respectively.

The docking base 230 may include a wheel guard 232 on which the auxiliary wheel 162 and the driving wheel unit 120 of the mowing robot 100 may be mounted. The wheel guard 232 may include a first wheel guard 232a to guide the movement of a first auxiliary wheel 162 and a second wheel guard 232b to guide the movement of the second auxiliary wheel 162.

A center base 231 which is convex upward may be provided between the first wheel guard 232a and the second wheel guard 232b. The docking base 230 may include a slip prevention unit 234 that prevents sliding of the first wheel 120a and the second wheel 120b. The slip prevention unit 234 may include a plurality of protrusions protruding upward.

Referring to FIG. 1 and FIG. 3 to FIG. 9, the body 110 may include the frame 111 to which the first motor 130a and the second motor 130b are fixed. The blade motor 150 may be fixed to the frame 111. The frame 111 may support the main board 163, a module supporter 180 described later, and the sensor 170. The frame 111 may support a module case 190. The frame 111 may support the battery Bt. The frame 111 may provide a skeletal structure that supports various other components. The frame 111 may be supported by the auxiliary wheel 162 and the driving wheel unit 120.

The body 110 may include a side blocking unit (or side guard) 111a that prevents a user's finger from touching the blade 140, and the side blocking guard 111a may be provided at both sides of the frame 111. The side blocking guard 111a may be fixed to the frame 111. The side blocking guard 111a may protrude downward in comparison with the lower side surface of another portion of the frame 111. The side blocking guard 111a may cover an upper portion of a space between the wheel module 120 and the auxiliary wheel 162.

A pair of side blocking guards 111a-1 and 111a-2 may be arranged laterally with the blade 140 interposed therebetween. The side blocking guard 111a may be spaced apart from the blade 140 by a certain distance.

A front face 111af of the side blocking guard 111a may be rounded. The front face 111af may form a surface that is rounded upward from the lower side surface of the side blocking guard 111*a* toward the front of the side blocking guard 111*a*. When the mowing robot 100 moves forward, the side blocking guard 111*a* may easily ride over a lower obstacle by using the shape of the front face 111*af*.

The body 110 may include a front blocking unit or guard 111*b* that prevents the user's finger from touching the blade 140 in front of the blade 140. The front blocking guard 111*b* may be fixed to the frame 111. The front blocking guard 111*b* may cover a part of an upper portion of a space between the pair of auxiliary wheels 162*a* and 162*b*.

The front blocking guard 111*b* may include a plurality of protrusion ribs 111*ba* that protrudes downward in comparison with a lower side surface of the other portion of the frame 111. The protrusion ribs 111*ba* may extend in the front and rear direction. An upper end portion of the protrusion rib 111*ba* may be fixed to the frame 111, and a lower end portion of the protrusion rib 111*ba* may form a free end.

The plurality of protrusion ribs may be spaced apart in the horizontal width direction. The plurality of protrusion ribs 111*ba* may be parallel to each other. A gap may be formed between two adjacent protrusion ribs 111*ba*.

The front of the protrusion ribs 111*ba* may be rounded. The front of the protrusion ribs 111*ba* may form a surface that is rounded upward from the lower side surface of the protrusion rib 111*ba* toward the front. When the mowing robot 100 moves forward, the protrusion rib 111*ba* may easily ride over the lower obstacle by using the shape of the front of the protrusion rib 111*ba*.

The front blocking guard 111*b* may include an auxiliary rib 111*bb* that may provide rigidity. The auxiliary rib 111*bb* may be provided between the upper end portions of two adjacent protrusion ribs 111*ba*. A plurality of auxiliary ribs 111*bb* may protrude downward and extend in a lattice shape.

The frame 111 may include a caster 107 which rotatably supports the auxiliary wheel 162. The caster 107 may be rotatably provided with respect to the frame 111. The caster 107 may be rotatable around the vertical axis. The caster 107 may be provided at the lower side the frame 111. A pair of casters 107 corresponding to the pair of auxiliary wheels 162 may be provided.

A caster connection unit (or caster connector) 103 that connects the frame 111 to the caster 107 may be provided. The caster connector 103 may pass through the frame 111. The caster connector 103 may be fixed to one of the frame 111 and the caster 107 and may be rotatably connected to the other. A pair of caster connectors 103*a* and 103*b* corresponding to the pair of casters 107 may be provided.

The body 110 may include the case 112 covering the frame 111 from an upper side thereof. The case 112 may form an upper side and the front/rear/left/right sides of the mowing robot 100.

A recessed portion (or recess) 112*a* may be formed on a side of the case 112. A pair of recesses 112*a* may be formed on both sides of the case 112. The recess 112*a* may include a portion where the recess depth gradually increases from the rear portion toward the front portion.

The body 110 may include a case connection unit (or case connector) 104 that fixes the case 112 to the frame 111. The case 112 may be fixed to an upper end of the case connector 104. The upper portion of the case connector 104 may be exposed to the upper side of the frame 111.

The case connector 104 may be provided in the frame 111 to be movable. The case connector 104 may be movable only in a vertical direction with respect to the frame 111. The case connector 104 may be movable only within a certain range.

The case connector 104 may be movable integrally with the case 112. Accordingly, the case 112 may be movable with respect to the frame 111.

A pair of case connectors 104*a* and 104*b* may be provided at both sides of the frame 111. The pair of case connectors 104*a* and 104*b* may be arranged at the front of the frame 111.

The frame 111 may include a movement sensor to detect the movement of the case connector 104. Thus, when the case 112 is lifted with respect to the frame 111, the case connector 104 may move upward and the movement sensor may detect the lifting of the case 112. When the movement sensor detects that the case 112 is lifted, the controller 163 may stop an operation of the blade 140. For example, when the user lifts the case 112 or a considerable sized lower obstacle lifts the case 112, the movement sensor may detect this situation and stop the blade 140.

The body 110 may include a bumper 112*b* provided at a front of the body 110. The bumper 112*b* may absorb an impact upon contact with an external obstacle. In the front portion of the bumper 112*b*, a bumper groove 112*h*, which is recessed toward a rear side of the body 110 and long in the horizontal width direction, may be formed. A plurality of bumper grooves 112*h* may be provided and arranged vertically. The lower end of the protrusion rib 111*ba* may be provided in a lower position than the lower end of the auxiliary rib 111*bb*.

The front of the bumper 112*b* and the left and right sides of the bumper 112*b* may be connected to each other. The front and sides of the bumper 112*b* may be connected in a rounded manner.

The body 110 may include a bumper auxiliary unit (or auxiliary bumper) 112*c* disposed around the outer surface of the bumper 112*b*. The auxiliary bumper 112*c* may cover the lower portion of the left and right sides and the lower portion of the front surface of the bumper 112*b*. The auxiliary bumper 112*c* may cover the lower half of the right and left sides and the front surface of the bumper 112*b*.

The front end surface of the auxiliary bumper 112*c* may be provided in front of the front end surface of the bumper 112*b*. The auxiliary bumper 112*c* may form a surface protruding from the surface of the bumper 112*b*.

The auxiliary bumper 112*c* may be formed of a material, such as rubber, that is advantageous for shock absorption. The auxiliary bumper 112*c* may be formed of a flexible material. The auxiliary bumper 112*c* may be coupled to the bumper 112*b*. The auxiliary bumper 112*c* may include a bumper coupling unit or coupler 112*ca* coupled to the bumper 112*b*.

Figure 5:
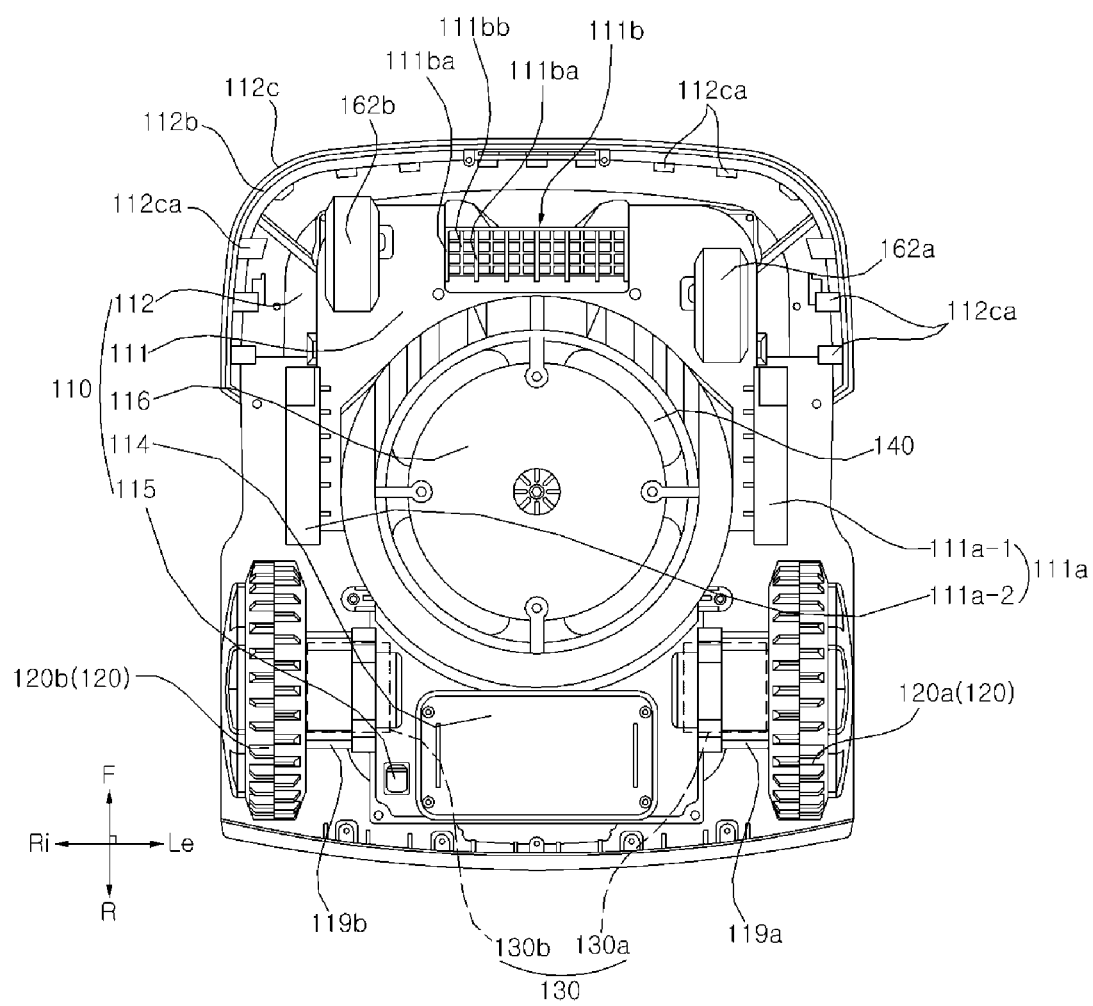
FIG. 5 is an elevational view of a lower side of the mowing robot 100 of FIG. 1.
Figure 6:
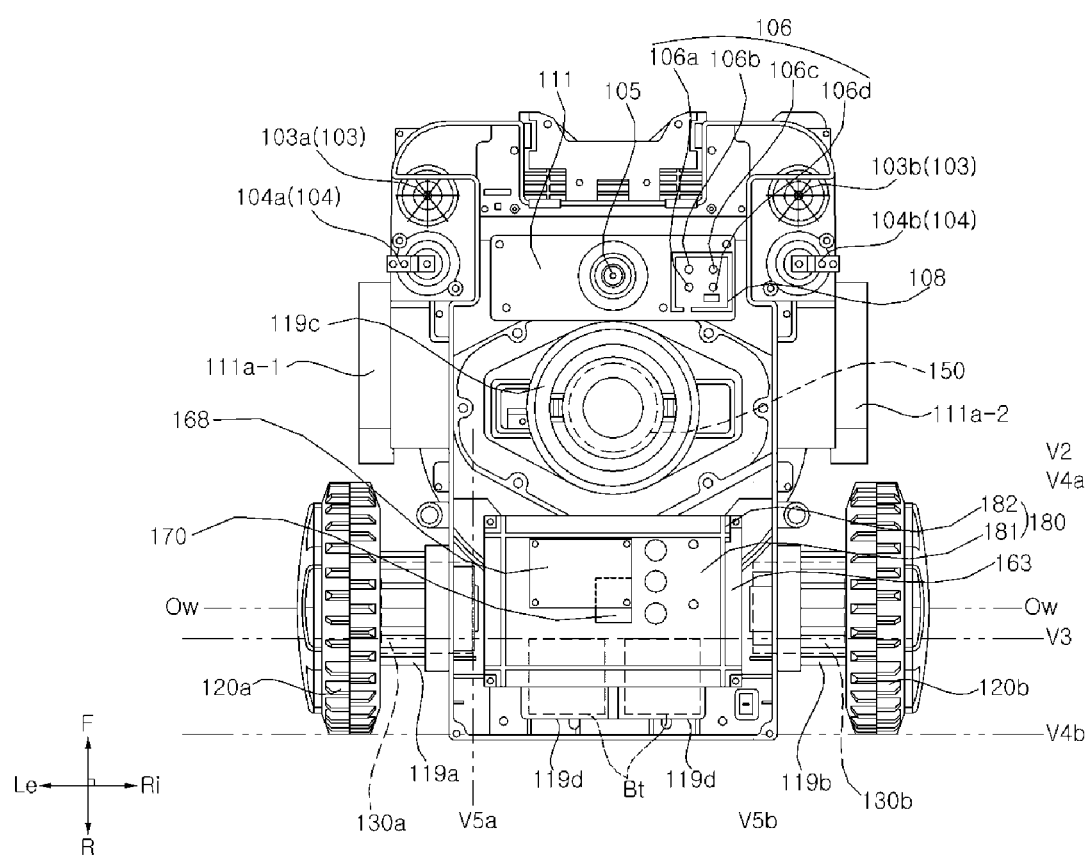
FIG. 6 is an elevational view of an upper side of the mowing robot 100 of FIG. 1 when a case 112 and a module case 190 are removed.
Figure 7:
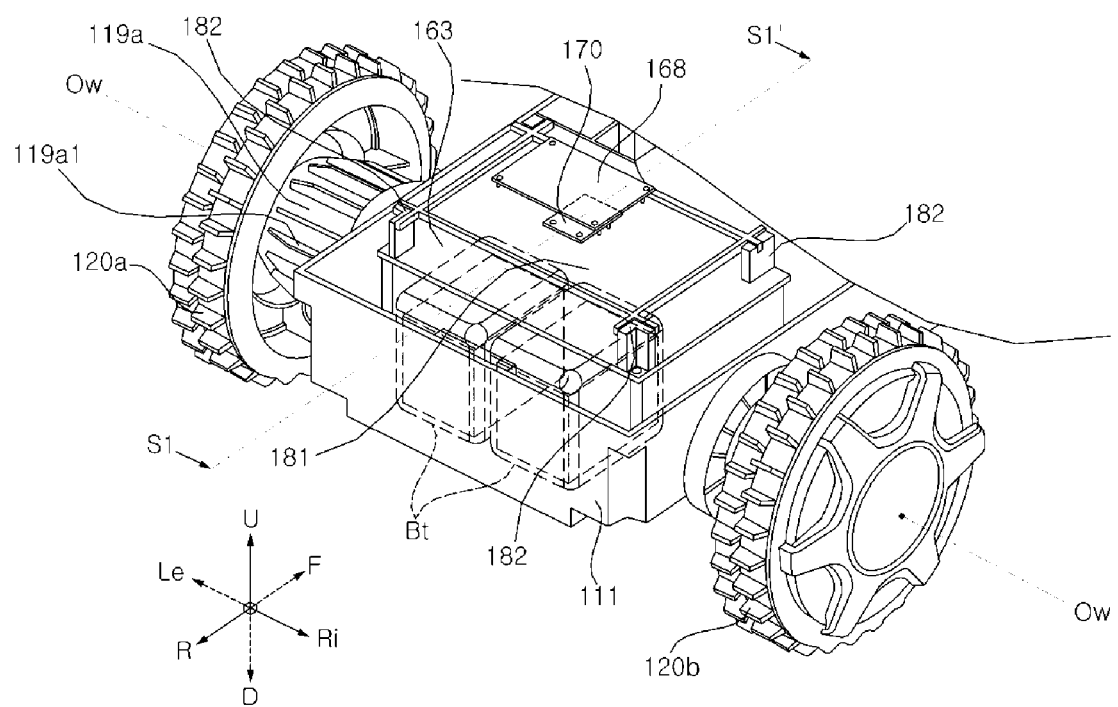
FIG. 7 is a partial perspective view showing a portion where a sensor 170 of the mowing robot 100 of FIG. 6 is disposed.
Figure 8:
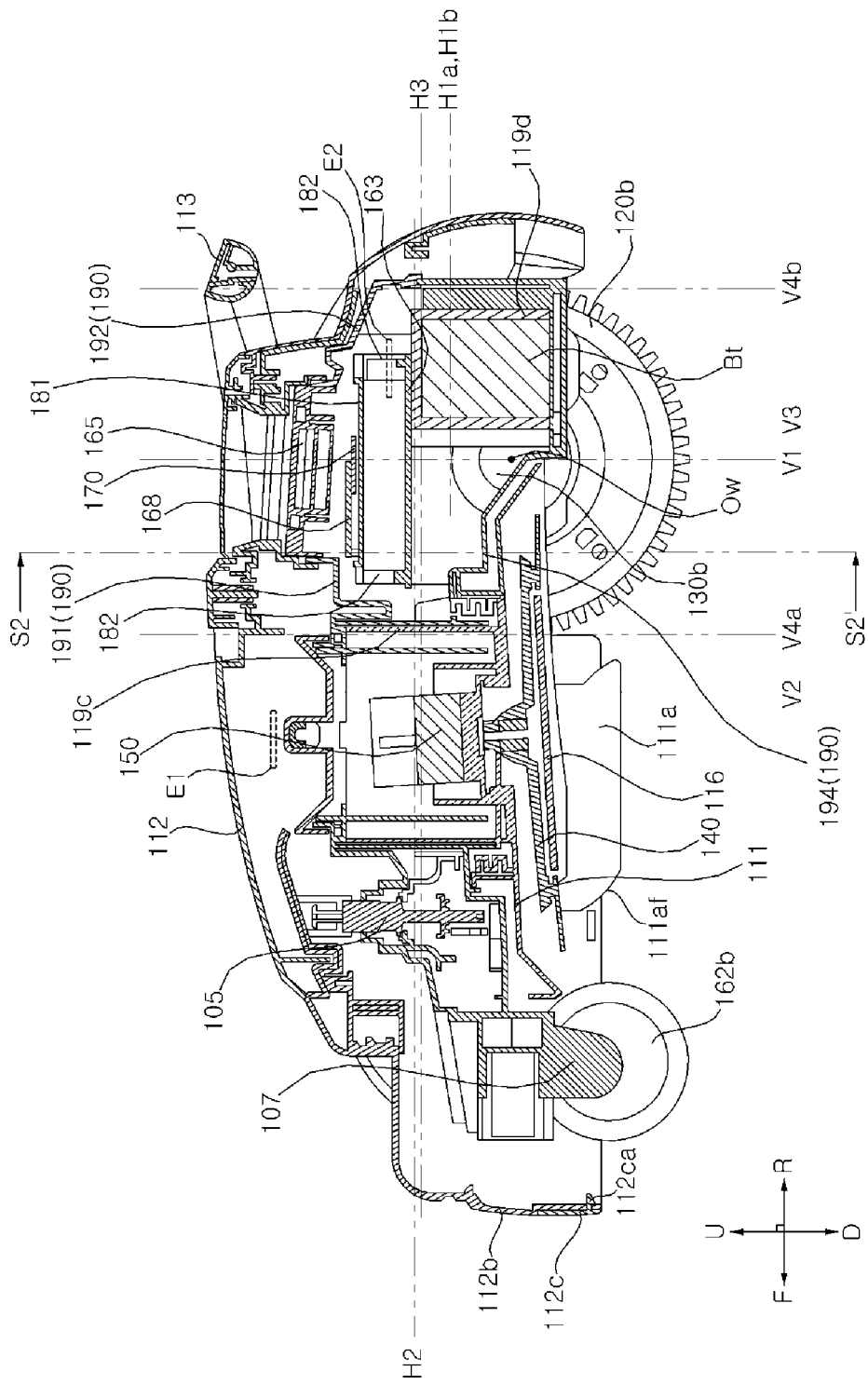
FIG. 8 is a cross-sectional view of the mowing robot 100 of FIG. 1 vertically taken along line S1-S1' of FIG. 7.

The bumper coupler 112*ca* may protrude from the auxiliary bumper 112*c* in the inward direction of the bumper 112*b* and may pass through the surface of the bumper 112*b*. The bumper coupler 112*ca* may have a hook and be hooked to the bumper 112*b*. FIG. 5 shows a state in which the bumper coupler 112*ca* passes through the bumper 112*b* and the protrusion end of the bumper coupler 112*ca* is provided at the rear surface of the bumper 112*b*.

The frame 111 may include a movement fixation unit (or joystick bumper) 105 to which the bumper 112*b* is fixed. The joystick bumper 105 may protrude upward from the frame 111. The bumper 112*b* may be fixed to an upper end of the joystick bumper 105.

The bumper 112*b* may be movable within a certain range with respect to the frame 111. The bumper 112*b* may be fixed to the joystick bumper 105 and move integrally with the joystick bumper 105.

The joystick bumper 105 may be movable in the frame 111. The joystick bumper 105 may be rotatably provided in the frame 111 within a certain range. The joystick bumper 105 may be rotatably provided with respect to the frame 111, about a virtual rotation axis extending in the protruding direction of the joystick bumper 105. Accordingly, the bumper 112b may be rotatably provided integrally with the joystick bumper 105 with respect to the frame 111.

A rotation sensor that detects a rotation of the joystick bumper 105 may be provided. For example, a magnet may be provided at one side of the lower portion of the joystick bumper 105, and a magnetic field sensing unit or sensor that senses a change in the magnetic field of the magnet may be provided in the frame 111. When the joystick bumper 105 is rotated, the magnetic field sensor may detect the change in the magnetic field of the magnet, thereby implementing the rotation sensor for detecting the rotation of the joystick bumper 105.

When the bumper 112b collides with an external obstacle, the joystick bumper 105 may rotate integrally with the bumper 112b. As the rotation sensor detects the rotation of the joystick bumper 105, the impact of the bumper 112b may be detected. The body 110 may include a handle 113. The handle 113 may be provided at the rear portion of the case 112.

The body 110 may include a battery input unit (or battery tray) 114 into which a battery Bt may be inserted. The battery tray 114 may be provided at the lower side surface of the frame 111. The battery tray 114 may be provided at the rear portion of the frame 111.

The body 110 may include a power switch 115 to turn on and off the power of the mowing robot 100. The power switch 115 may be provided at the lower side surface of the frame 111. The body 110 may include a blade protection unit (or bottom blade guard) 116 that covers the lower side of the center of the blade 140. The bottom blade guard 116 may expose the cutting edge of the blade 140 in the centrifugal direction, and to cover the center of the blade 140.

The body 110 may include a first opening and closing unit (or first cover) 117 that may be opened and closed to expose the height adjustment knob 166 and the height display 167. The first cover 117 may be hinged to the case 112 so as to accomplish opening and closing operations. The first cover 117 may be provided at the upper side surface of the case 112. The first cover 117 may have a plate shape, and may cover the upper side of the height adjustment knob 166 and the height display 167 when closed.

The body 110 may include a second opening and closing unit (or second cover) 118 that may be opened and closed to expose the display 165 and the input 164. The second cover 118 may be hinged to the case 112 so as to accomplish opening and closing operations. The second cover 118 may be provided at the upper side surface of the case 112. The second cover 118 may be arranged behind the first opening and closing unit 117. The second cover 118 may have a plate shape, and may cover the display 165 and the input 164 when closed.

The openable angle of the second cover 118 may be smaller than the openable angle of the first cover 117. Thus, even when the second cover 118 is open, user may easily open the first cover 117 as well and may easily operate the height adjustment knob 166. In addition, even when the second cover 118 is open, the user may visually check the contents of the height display 167.

For example, the openable angle of the first cover 117 may be about 80 to about 90 degrees based on a closed state. For example, the openable angle of the second cover 118 may be about 45 to about 60 degrees based on a closed state.

The rear end portion of the first cover 117 may be lifted upward to be opened based on the front end portion thereof, and the rear end portion of the second cover 118 may be lifted upward to be opened based on the front end portion thereof. Thus, the user may open and close the first cover 117 and the second cover 118, in the rear of the mowing robot 100 which is a safe area when the mowing robot 100 moves forward. The opening operation of the first cover 117 and the opening operation of the second cover 118 may be prevented from interfering with each other.

The first cover 117 may be rotatable with respect to the case 112, about the rotation axis extending in the horizontal width direction in the front end of the first cover 117. The second cover 118 may be provided to be rotatable with respect to the case 112, about the rotation axis extending in the horizontal width direction in the front end of the second cover 118.

The mowing robot 100 may include an opening and closing detection unit (or cover detection sensor) that detects whether at least one of the first cover 117 and the second cover 118 is open or closed. The cover detection sensor may be provided in the case 112. The cover detection sensor may be provided at the upper side of the frame 111.

The frame 111 may include a cable connection unit (or cable connector) 106 to which a cable may be connected. The cable connector 106 may include a plurality of terminals to which a plurality of cables are connected respectively.

The plurality of terminals may include a first terminal 106a to which a cable for transmitting detection information of the obstacle detection sensor 161 is connected. The plurality of terminals may include a second terminal 106b to which a cable for transmitting detection information of the rain detection sensor is connected. The plurality of terminals may include a third terminal 106c to which a cable for transmitting detection information of the cover detection sensor is connected. The plurality of terminals may include a fourth terminal 106d to which a cable for transmitting input information of the input 164 is connected.

The obstacle detection sensor 161, the rain detection sensor, the cover detection sensor, and the input 164 may be provided in the upper side of the frame 111, and the cable connector 106 may be provided at the upper side surface of the frame 111. A signal (detection information, input information) transmitted to the plurality of terminals may be transmitted to the controller 163 through a cable or the like.

The plurality of terminals may be arranged concentrically in a part of the frame. When viewed from above, the plurality of terminals may be surrounded by a cable guide 108. The cable guide 108 may be formed in a rib shape protruding upward from the frame 111. The cable guide 108 may extend in a rectangular shape when viewed from in the upper side of, and a groove may be formed at a part of one side surface. The cable may be inserted into the groove of the cable guide 108, so that it may guide the disposition of the cable.

The driving wheel 120 may include a first wheel 120a provided at the left side and a second wheel 120b provided at the right side. The first wheel 120a may be provided at the left side of the second wheel 120b. The first wheel 120a and the second wheel 120b may be spaced laterally. The first wheel 120a and the second wheel 120b may be provided at a rear lower portion of the body 110.

The first wheel 120a and the second wheel 120b may be independently rotatable so that the body 110 may rotate and move forward with respect to the ground. For example, when the first wheel 120a and the second wheel 120b rotate at the same rotational speed, the body 110 may move forward with respect to the ground. For another example, when the rotational speed of the first wheel 120a is higher than the rotational speed of the second wheel 120b, or when the rotational direction of the first wheel 120a and the rotational direction of the second wheel 120b are different from each other, the body 110 may rotate with respect to the ground.

The first wheel 120a and the second wheel 120b may be larger than the auxiliary wheel 162. The axis of the first motor 130a may be fixed to the center of the first wheel 120a, and the axis of the second motor 130b may be fixed to the center of the second wheel 120b.

The wheel 120 may include a wheel periphery unit (or wheel tread) 122 in contact with the ground. For example, the wheel tread 122 may be a tire. The wheel tread 122 may include a plurality of protrusions for enhancing the frictional force with the ground.

The wheel 120 may include a wheel frame which fixes the wheel tread 122 and receives the power of the motor 130. The axis of the motor 130 may be fixed to the center of the wheel frame, and the wheel frame may receive a rotational force from the motor 130. The wheel tread 122 may be provided around the wheel frame.

The wheel 120 may include a wheel cover 121 that covers the outer surface of the wheel frame 121. The wheel cover 121 may be provided in the opposite direction (hereinafter referred to as 'outer direction') to the direction in which the motor 130 is arranged based on the wheel frame. The wheel cover 121 may be provided at the center of the wheel tread 122. The wheel axis Ow may pass through the center of the wheel cover 121.

The wheel cover 121 may include a central portion (or hub) 121a through which the wheel axis Ow passes. The hub 121a may be formed in a circular shape when viewed from the side.

The wheel cover 121 may include a centrifugal unit (or spoke) 121b extending in the direction away from the wheel axis Ow at the hub 121a. A plurality of the spokes 121b may be spaced apart from each other by a certain distance along the circumferential direction based on the wheel axis Ow. In the present embodiment, six spokes 121b may be provided.

The hub 121a and the spoke 121b may have a surface which protrudes in the outward direction in comparison with the other portion 121c of the wheel cover 121. The wheel cover 121 may include a recessed portion (or recess) 121c having a surface which is dented in the opposite direction to the outward direction in comparison with the hub 121a and the spoke 121b. The recess 121c may be arranged between two adjacent spokes 121b.

The driving motor module 130 may include a first motor 130a provided at the left side and a second motor 130b provided at the right side. The first motor 130a may be provided at the left side of the second motor 130b. The first motor 130a and the second motor 130b may be spaced laterally.

The first motor 130a and the second motor 130b may be provided at the lower side portion of the body 110. The first motor 130a and the second motor 130b may be provided at the rear portion of the body 110. The first motor 130a may be provided at the right side of the first wheel 120a, and the second motor 130b may be provided at the left side of the second wheel 120b. The first motor 130a and the second motor 130b may be fixed to the body 110.

The blade 140 may be arranged in front of the center of the first wheel 120a. The blade 140 may be arranged in front of the center of the second wheel 120b. The blade 140 may be arranged in front of the wheel axis Ow.

The blade 140 may be provided at the rear side of the auxiliary wheel 162. The blade 140 may be provided at the lower side portion of the body 110. The blade 140 may rotate on a rotation axis extending in the vertical direction.

The blade motor 150 may be arranged in front of the center of the first wheel 120a. The blade motor 150 may be arranged in front of the center of the second wheel 120b. The blade motor 150 may be arranged in front of the wheel axis Ow.

The blade motor 150 may be provided at the rear side of the auxiliary wheel 162. The blade motor 150 may be provided at the lower side portion of the body 110. The blade motor 150 may rotate a motor axis protruding upward. The rotational force of the motor axis may be transmitted to the blade 140 by using a configuration such as a gear.

The sensor 170 may have a gyro sensing function for at least horizontal rotation of the body 110. At the same time, the sensor 170 may have a magnetic field sensing function. Furthermore, the sensor 170 may further have an acceleration sensing function.

The sensor 170 may, preferably, have a gyro sensing function for three axes of a spatial coordinate system orthogonal to each other. In addition, the sensor 170 may have a magnetic field sensing function for the three axes. In addition, the sensor 170 may have an acceleration sensing function for the three axes.

The sensor 170 may vertically overlap with a wheel area including the first wheel, the second wheel, and an area in which the first wheel and the second wheel are connected in the horizontal direction, and may be provided at a position vertically higher than the first motor 130a and the second motor 130b. The sensor 170 may be arranged between the wheel front end plane V4a and the wheel rear end plane V4b. Specifically, the sensor 170 may be provided at the rear side of the wheel front end plane V4a, and arranged in front of the wheel rear end plane V4b. This may allow the sensor 170 to perform gyro sensing for horizontal rotation at the center (between the first wheel and the second wheel 120b) where the horizontal rotation of the mowing robot 100 occurs, so that information effectively reflecting the horizontal rotation of the mowing robot 100 can be detected.

In addition, the sensor 170 may be located closest to the wheel axis plane V1 among the wheel front end plane V4a, the wheel rear end plane V4b, and the wheel axis plane. Specifically, a detecting point of the sensor 170 may be located closest to the wheel axis plane V1 among the wheel front end plane V4a, the wheel rear end plane V4b, and the wheel axis plane. In addition, the sensor 170 may be positioned to cross the wheel axis plane V1. Through such a disposition of the sensor 170, information more effectively reflecting the horizontal rotation of the mowing robot 100 can be detected.

The sensor 170 may be provided at the upper side of the first motor upper end plane H1a. The sensor 170 may be provided at the upper side of the second motor upper end plane H1b. In addition, the sensor 170 may be provided at the right side of the first motor right end plane V5a, and provided at the left side of the second motor left end plane V5b. Accordingly, when the sensor 170 detects an external magnetic field, the influence of the magnetic field of the first motor 130a and the second motor 130b may be reduced.

The sensor 170 may be provided at the upper side of the blade motor upper end plane H2. The sensor 170 may be provided at the rear side of the blade motor rear end plane V2. Accordingly, when the sensor 170 detects an external magnetic field, the influence of the magnetic field of the blade motor 150 may be reduced.

The sensor 170 may be provided at the upper side of the virtual battery upper end plane which is in contact with the upper end of the battery and is horizontally arranged. The sensor 170 may be located in front of the battery front end plane V3. Accordingly, when the sensor 170 detects an external magnetic field, the influence of the magnetic field of the battery Bt may be reduced.

Preferably, the sensor 170 may be provided at the upper side of the first motor upper end plane H1a, the second motor upper end plane H1b, the blade motor upper end plane H2, and the battery upper end plane. The sensor 170 may be provided at the upper side of the internal space of the body 110. The first motor 130a and the second motor 130b may be provided at the lower side portion of the internal space. The blade motor 150 may be provided at the lower side portion of the internal space. The battery (Bt) may be provided at the lower side portion of the internal space. This makes it possible to reduce the influence of the magnetic field of the first motor 130a, the second motor 130b, the blade motor 150, and the battery Bt, when the sensor 170 detects an external magnetic field.

The blade motor 150 may be provided at the lower side of the center portion in the internal space of the body 110. The battery Bt may be provided at the lower side of the rear side portion in the internal space of the body 110. The first motor 130a may be provided at the lower side of the left side portion in the internal space of the body 110. The second motor 130b may be provided at the lower side of the right side portion in the internal space of the body 110.

The front end of the first motor 130a may be located in front of the battery front end plane V3. The front end of the second motor 130b may be located in front of the battery front end plane V3. The upper end of the first motor 130a may be lower than the battery upper end plane H3. The upper end of the second motor 130b may be lower than the battery upper plane H3. The upper end of the first motor 130a may be lower than the blade motor upper end plane H2. The upper end of the second motor 130b may be lower than the blade motor upper end plane H2.

The sensor 170 may have a horizontal plate shape. The sensor 170 may be covered by the main board 163 when viewed from a lower side thereof. The sensor 170 may be covered by a cover 181 when viewed from a lower side thereof. The sensor 170 may be provided in the center of the cover 181. The main board 163 may control the driving of the first motor 130a and the second motor 130b. The main board 163 may control the driving of the blade motor 150.

The main board 163 may be provided at the upper side of the first motor 130a and the second motor 130b. The main board 163 may be provided at the upper side of the first motor upper end plane H1a. The main board 163 may be provided at the upper side of the second motor upper end plane H1b. In addition, the main board 163 may be arranged between the first motor right end plane V5a and the second motor left end plane V5b.

The main board 163 may be provided at the upper side of the blade motor upper end plane H2. The main board 163 may be provided at the upper side of the battery upper end plane H3. The main board 163 may be provided at the lower side of the cover 181. The main board 163 may be spaced from the cover 181.

When viewed from below, the main board 163 may fully cover the cover 181. The horizontal area of the main board 163 may be larger than the horizontal area of the cover 181. The length of the main board 163 in the left and right direction may be larger than the length of the cover 181 in the left and right direction. The length of the front and rear direction of the main board 163 may be larger than the length of the front and rear direction of the cover 181.

The main board 163 may be provided at the lower side of the sensor 170. The main board 163 may fully cover the sensor 170 when viewed from the lower side thereof. Thus, the main board 163 may reduce the influence of the magnetic field on the first motor 130a, the second motor 130b, the blade motor 150, and the sensor 170 of the battery Bt.

Figure 9:
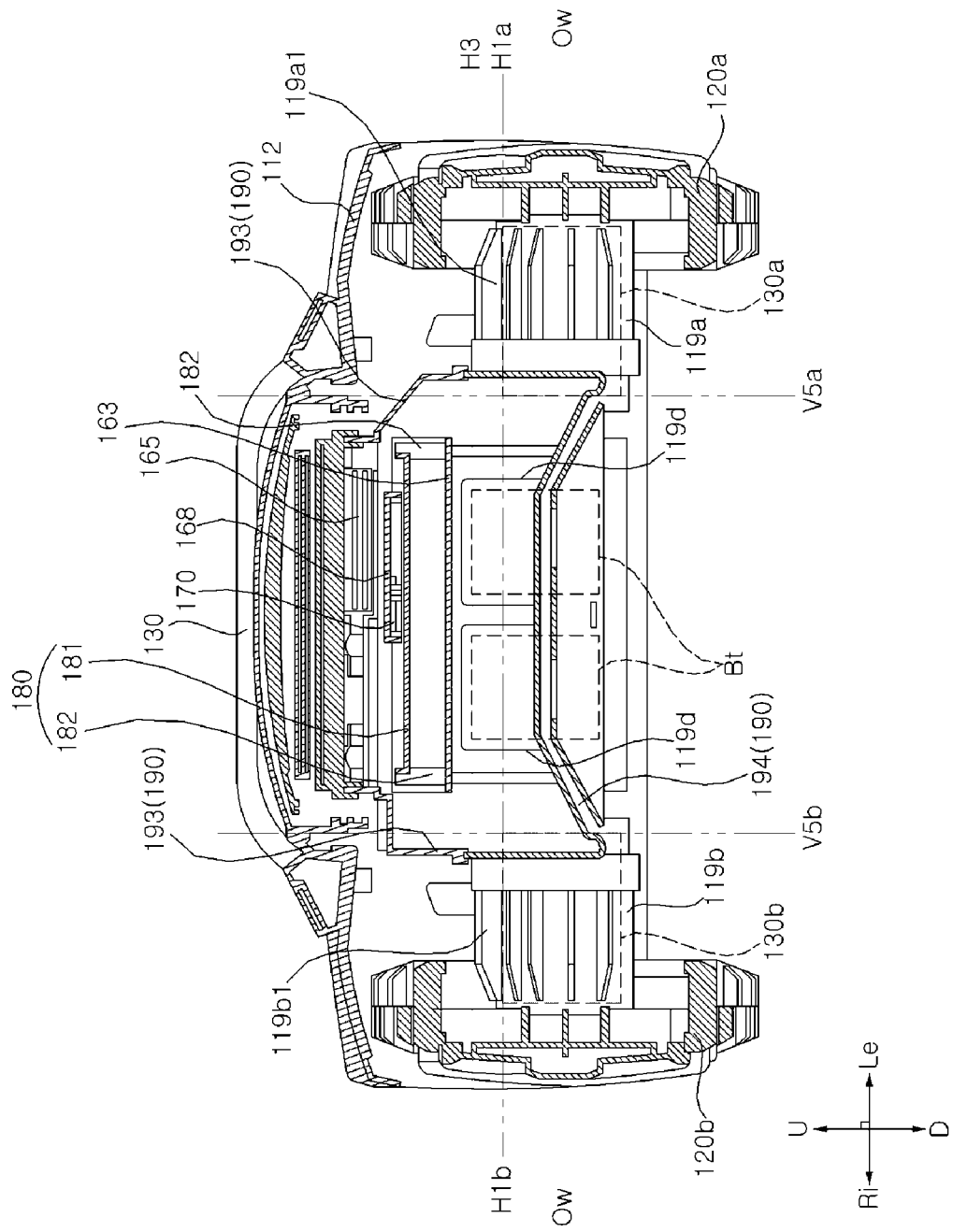
FIG. 9 is a cross-sectional view of the mowing robot 100 of FIG. 8 vertically taken along line S2-S2'.

Referring to FIG. 9, an experimental example according to the disposition structure of the present disclosure will be described when viewed from the lower side thereof. For each experimental group, the magnetic field is measured for the X axis and the Y axis, and a corresponding average magnitude (XY average magnetic field) is calculated based on uT unit. Here, the plane containing the X axis and the Y axis means a horizontal plane. This experiment is intended to compare the results of the measurement of the magnetic field according to the disposition of the sensor 170 according to the present embodiment and the disposition of the sensor 170 according to other comparative example E1, E2.

For the control group for this experiment, the magnetic field measurement result is 301.9772 uT in an external environment independent of the mowing robot 100. The magnetic field measurement result of the sensor 170 according to the present embodiment is 308.0956 uT, which shows a very slight difference in comparison with the control group. On the other hand, the result of measuring the magnetic field by disposing the sensor 170 in a position E1 according to a comparison group 1 is 271.9353 and the result of measuring the magnetic field by disposing the sensor 170 in a position E2 according to a comparison group 2 is 385.6744 uT, which is significantly different from the control group.

In the upper side of mentioned experiment, a difference between the results of the magnetic field measurement of the control group and the present embodiment is about 6 uT. On the other hand, a difference between the results of the magnetic field measurement of the control group and the comparison group 1 is about 30 uT, and a difference between the results of the magnetic field measurement of the control group and the comparison group 1 is about 83 uT. When comparing the control group 1 and the control group 2 with the present embodiment, it can be seen that the accuracy of the measurement result of the magnetic field of the sensor 170 according to the present embodiment may be remarkably improved.

Referring to FIG. 6 to FIG. 9, the main board 163 may be arranged across a virtual straight line path between the sensor 170 and the first motor 130a. The main board 163 may be arranged across a virtual straight line path between the sensor 170 and the second motor 130b. The main board 163 may be arranged across a virtual straight line path between the sensor 170 and the blade motor 150. The main board 163 may be arranged across a virtual straight line path between the sensor 170 and the battery Bt.

The horizontal area of the main board 163 may be larger than the horizontal area of the sensor 170. The length of the main board 163 in the horizontal width direction may be greater than the length of the sensor 170 in the horizontal width direction. The length of the main board 163 in the horizontal length direction may be greater than the length of the sensor 170 in the horizontal length direction.

The main board 163 may have a horizontal plate shape. The main board 163 may have a rectangular shape when viewed from the lower side of the main board 163. Various elements may be provided at the upper side surface of the main board 163.

The rear end of the main board 163 may be positioned behind the battery front end plane V3. The left end of the main board 163 may be provided at the left side of the left end of the battery Bt, and the right end of the main board 163 may be provided at the right side of the right end of the battery Bt.

The front end of the main board 163 may be positioned in front of the center of the first wheel and the center of the second wheel. The front end of the main board 163 may be positioned in front of the wheel axis plane V1.

The mowing robot 100 may include a module supporter 180 that may support the sensor 170. The module supporter 180 may be fixed to the main board 163. The module supporter 180 may include the cover 181. The module supporter 180 may include a covering supporting unit (or cover support) 182 to fix the cover 181 to the main board 163 while spacing the cover 181 away from the main board 163.

The sensor 170 may be fixed to the cover 181. For example, four corners of the sensor 170 may be fastened to the cover 181 by a fastening member. The cover 181 may fully cover the sensor 170 when viewed from the lower side thereof. Thus, the main board 163 may reduce the influence of the magnetic field on the first motor 130a, the second motor 130b, the blade motor 150, and the sensor 170 of the battery Bt.

The cover 181 may fully cover the sensor 170 when viewed from the first motor 130a, and fully cover the sensor when viewed from the second motor. The cover 181 may be provided across a virtual straight line path between the sensor 170 and the first motor 130a. The cover 181 may be provided across a virtual straight line path between the sensor 170 and the second motor 130b.

The cover 181 may fully cover the sensor 170 when viewed from the blade motor 150. The cover 181 may be provided across a virtual straight line path between the sensor 170 and the blade motor 150.

The cover 181 may fully cover the sensor 170 when viewed from the battery Bt. The cover 181 may be provided across a virtual straight line path between the sensor 170 and the battery Bt.

The horizontal area of the cover 181 may be larger than the horizontal area of the sensor 170. The length of the cover 181 in the horizontal width direction may be greater than the length of the sensor 170 in the horizontal width direction. The length of the cover 181 in the horizontal length direction may be greater than the length of the sensor 170 in the horizontal length direction.

The cover 181 may have a horizontal plate shape. The cover 181 may be smaller than the main board 163 when viewed from below. The sensor 170 may be fixed to an upper side surface of the cover 181.

The rear end of the cover 181 may be positioned behind the battery front end plane V3. The left end of the cover 181 may be provided at the left side of the left end of the battery Bt, and the right end of the cover 181 may be provided at the right side of the right end of the battery Bt.

The front end of the cover 181 may be positioned in front of the center of the first wheel and the center of the second wheel. The front end of the cover 181 may be positioned in front of the wheel axis plane V1.

The cover support 182 may extend in the vertical direction, and the lower end thereof may be fixed to the main board 163, and the upper end thereof may be fixed to the cover 181. A plurality of cover supports 182 may be provided. In the present embodiment, four cover supports 182 may be fixed to four corners of the cover 181.

The GPS board 168 may be provided between the wheel front end plane V4a and the wheel rear end plane V4b. In addition, the GPS board 168 may be positioned closest to the wheel axis plane V1, among the wheel front end plane V4a, the wheel rear end plane V4b, and the wheel axis plane.

The GPS board 168 may be provided at the upper side of the cover 181. The GPS board 168 may be provided at the upper side of the sensor 170. The GPS board 168 may be fixed to the cover 181 by a fastening member. The GPS board 168 may form a gap spaced apart from the upper side surface of the cover 181, and at least a part of the sensor 171 may be provided in the gap. The cover 181 may cover the GPS board 168 when viewed from below. The main board 163 may fully cover the GPS board 168 when viewed from below.

The mowing robot 100 may include a module case 190 provided inside the body. The module case 190 may accommodate the sensor 170 therein. The module case 190 may accommodate a module supporter 180 therein. The module case 190 may accommodate the main board 163 therein. The module case 190 may accommodate the GPS board 168 therein.

The module case 190 may be provided separately from the case 112. The module case 190 may be coupled to the frame 111. A part of the upper side surface of the module case 190 may be exposed to the outside in the opened state of the second cover 118.

The module case 190 may include a module case front part (or module case front) 191, a module case rear part (or module case rear) 192, and a module case side part (or module case side) 193. The module case front 191, the module case rear 192, and the module case side 193 may support the display module 165. The module case front 191, the module case rear 192, and the module case side 193 may cover the sensor 170 from above. The module case 190 may include a module case lower unit (or module case bottom) 194 that covers the sensor 170 from below.

The display module 165 may be provided at the upper side of the sensor 170. The display module 165 may be spaced apart from the sensor 170 in the vertical direction. The display module 165 may be fixed to the upper side portion of the module case 190. The sensor 170 may be provided between the display module 165 and the cover 181.

The battery Bt may be arranged behind the center of the first wheel 120a and the center of the second wheel 120b. The battery Bt may be provided at the rear side of the wheel axis plane. A pair of batteries Bt may be arranged laterally. The battery Bt may be provided between the first motor right end plane V5a and the second motor left end plane V5b.

The battery Bt may supply power to the first motor 130a. The battery Bt may supply power to the second motor 130b. The battery Bt may supply power to the blade motor 150. The battery Bt may provide power to the main board 163, the sensor 170, and the display module 165.

The mowing robot 100 may include a first motor housing 119a that accommodates the first motor 130a therein and a second motor housing 119b that accommodates the second motor 130b therein. The first motor housing 119a may be fixed to the left side of the frame 111 and the second motor housing 119b may be fixed to the right side of the frame. The right end of the first motor housing 119a may be fixed to the frame 111. The left end of the second motor housing 119b may be fixed to the frame 111.

The first motor housing 119a may have a cylindrical shape that forms a height in the left and right direction as a whole. A rigid reinforcing rib 119a1 may be formed in an outer periphery portion of the first motor housing 119a. The rigid reinforcing ribs 119a1 may protrude from the outer periphery portion of the first motor housing 119a in a direction away from the wheel axis Ow. The rigid reinforcing ribs 119a1 may be elongated in a direction parallel to the wheel axis Ow. A first end of the rigid reinforcing rib 119a1 may be fixed to the frame 111. A second end of the rigid reinforcing rib 119a1 may taper in towards the first motor housing 119a. A plurality of rigid reinforcing ribs 119a1 may be spaced apart from each other around the outer periphery portion of the first motor housing 119a.

The second motor housing 119b may have a cylindrical shape that forms a height in the left and right direction as a whole. A rigid reinforcing rib 119ab1 may be formed in an outer periphery portion of the second motor housing 119b. The rigid reinforcing ribs 119b1 may protrude from the outer periphery portion of the second motor housing 119b in a direction away from the wheel axis Ow. The rigid reinforcing ribs 119b1 may be elongated in a direction parallel to the wheel axis Ow. A first end of the rigid reinforcing rib 119b1 may be fixed to the frame 111. A second end of the rigid reinforcing rib 119b1 may taper in towards the second motor housing 119b. A plurality of rigid reinforcing ribs 119b1 may be spaced apart from each other around the outer periphery portion of the second motor housing 119b.

The first motor housing 119a may block a virtual straight line path between the sensor 170 and the first motor 130a. The second motor housing 119b may block a virtual straight line path between the sensor 170 and the second motor 130b.

The first motor 130a may be provided inside the first motor housing 119a, and the motor axis may protrude towards a lateral side of the frame 111. The second motor 130b may be provided inside the second motor housing 119b, and the motor axis may protrude towards a lateral side of the frame 111.

The mowing robot 100 may include a blade motor housing 119c that accommodates the blade motor 150 therein. The blade motor housing 119c may be fixed to the center of the frame 111. The lower end of the blade motor housing 119c may be fixed to the frame 111. The blade motor housing 119c may have a cylindrical shape that forms a height in the vertical direction as a whole. The blade motor housing 119c may block a virtual straight line path between the sensor 170 and the blade motor 150.

The mowing robot 100 may include a battery housing 119d that accommodates the battery Bt therein. A pair of battery housings 119d may correspond to a pair of batteries Bt. The battery housing 119d may be provided at the rear side of the frame 111. The lower end of the battery housing 119d may be fixed to the frame 111. The battery housing 119d may have an opening formed at a lower side portion thereof to allow the battery Bt to be drawn in and out through the opening. The battery tray 114 may block the opening of the battery housing 119d.

The first wheel and the second wheel may be independently driven so that an area connecting the first wheel and the second wheel becomes a center where rotational motion on a horizontal plane occurs. By providing the sensor between the wheel front end plane and the wheel rear end plane, information that effectively reflects the horizontal rotation of the mowing robot may be detected.

The sensor may be provided relatively closest to the wheel axis plane or may cross the wheel axis plane, so that the information that more effectively reflects the horizontal rotation of the mowing robot may be detected.

The sensor may be provided at the upper side of the first motor upper end plane and the sensor may be provided at the upper side of the second motor upper end plane, so that the influence of the magnetic field of the first motor and the second motor may be reduced when the sensor detects an external magnetic field.

The sensor may be provided at the upper side of the upper end plane of the blade motor and provided at the rear side of the rear end plane of the blade motor, so that the influence of the magnetic field of the blade motor may be reduced when the sensor detects an external magnetic field. The sensor may be provided at the upper side of the battery upper end plane, and may be provided in front of the battery front end plane, so that the influence of the magnetic field of the battery may be reduced when the sensor detects an external magnetic field.

The main board may cover the sensor, so that the main board may reduce the magnetic field influence of the first motor, the second motor, the blade motor, and the battery on the sensor. The cover may cover the sensor, so that the cover may reduce the magnetic field influence of the first motor, the second motor, the blade motor, and the battery on the sensor.

The sensor may have a gyro sensing function, a magnetic field sensing function, and an acceleration sensing function, thereby reducing the sensor cost and detecting information that effectively reflects the rotational movement or the straight forward/backward movement of the mowing robot through the disposition feature of the sensor. In particular, when the mowing robot is rotating, if the gyro sensing and acceleration sensing are performed in a position far away from the wheel axis plane in the front and rear direction, there is a problem of measuring information that is different from the actual traveling track of the mowing robot. The solving means of the present disclosure may detect the external magnetic field by minimizing the influence of the first motor, the second motor, the blade motor, and/or the battery, while achieving accurate track estimation.

Although the exemplary embodiments of the present disclosure have been disclosed for illustrative purposes, those skilled in the art will appreciate that various modifications, additions and substitutions are possible, without departing from the scope and spirit of the present disclosure as disclosed in the accompanying claims. Accordingly, the scope of the present disclosure is not construed as being limited to the described embodiments but is defined by the appended claims as well as equivalents thereto.

When a mowing robot is equipped with a gyro sensor and a magnetic field sensor separately, the cost of sensor and the structural requirement for disposing each sensor are increased. According to the present disclosure, a sensor having both a gyro sensing function and a magnetic field sensing function may be used in order to reduce the cost and the structural requirement, and an autonomous driving of the mowing robot may be controlled according to the detection result of the sensor. In particular, since the mowing robot travels outdoors unlike a cleaning robot that travels indoors, it may be difficult to check a position through the surrounding image, and the role of the gyro sensing function and the acceleration sensing function may be important.

A mowing robot may includes a body which forms an outer shape and an internal space; a first wheel and a second wheel which are independently rotatably provided in a left side and a right side respectively so that the body can rotate and move forward with respect to ground; a first motor which provides a rotational force of the first wheel; a second motor which provides a rotational force of the second wheel; and a sensor which is disposed in the internal space, has a gyro sensing function for at least horizontal rotation, and has a magnetic field sensing function, when i) a virtual wheel front end plane which is in contact with a front end of the first wheel and a front end of the second wheel and is vertically disposed; ii) a virtual wheel rear end plane which is in contact with a rear end of the first wheel and a rear end of the second wheel and is vertically disposed; iii) a virtual first motor upper end plane which is in contact with an upper end of the first motor and is horizontally disposed; and iv) a virtual second motor upper end plane which is in contact with an upper end of the second motor and is horizontally disposed are defined, wherein the sensor is disposed between the wheel front end plane and the wheel rear end plane, and is disposed in an upper side of the first motor upper end plane and the second motor upper end plane.

The sensor may be provided closest to a virtual wheel axis plane, among the wheel front end plane, the wheel rear end plane, and the wheel axis plane which passes through a center of the first wheel and a center of the second wheel and is disposed vertically. The sensor may cross the wheel axis plane.

The mowing robot may further include a blade which is disposed in front of a center of the first wheel and a center of the second wheel and is rotatably provided for mowing; a blade motor which provides a rotational force of the blade; and a battery which is disposed behind the center of the first wheel and the center of the second wheel and provides power to the first motor, the second motor, and the blade motor, and the sensor is disposed in an upper side portion of the internal space, and the first motor, the second motor, the blade motor, and the battery are disposed in a lower side portion of the internal space.

The mowing robot may further include a blade which is disposed in front of a center of the first wheel and a center of the second wheel and is rotatably provided for mowing; and a blade motor which provides a rotational force of the blade, and the sensor is disposed in a rear side of a virtual blade motor rear end plane which is in contact with a rear end of the blade motor and is vertically disposed, and disposed in an upper side of a virtual blade motor upper end plane which is in contact with an upper end of the blade motor and is horizontally disposed.

The mowing robot may further include a battery which is provided at a center of the first wheel and a center of the second wheel and provides power to the first motor and the second motor, and the sensor is disposed in front of a virtual battery front end plane which is in contact with a front end of the battery and is vertically disposed, and disposed in an upper side of a virtual battery upper end plane which is in contact with an upper end of the battery and is horizontally disposed.

The mowing robot may further include a blade which is disposed in front of a center of the first wheel and a center of the second wheel and is rotatably provided for mowing; a blade motor which provides a rotational force of the blade; and a battery which is disposed behind the center of the first wheel and the center of the second wheel and provides power to the first motor, the second motor, and the blade motor, and the sensor is disposed in a rear side of a virtual blade motor rear end plane which is in contact with a rear end of the blade motor and is vertically disposed, and disposed in front of a virtual battery front end plane which is in contact with a front end of the battery and is vertically disposed.

The sensor may be provided at an upper side of a virtual blade motor upper end plane which is in contact with an upper end of the blade motor and is horizontally disposed, and may be provided at an upper side of a virtual battery upper end plane which is in contact with an upper end of the battery and is horizontally disposed.

The first motor may be provided at a left side of the second motor, and the sensor may be provided at a right side of a virtual first motor right end plane which is in contact with a right end of the first motor and is vertically disposed, and disposed in a left side of a virtual second motor left end plane which is in contact with a left end of the second motor and is vertically disposed.

The mowing robot may further include a cover, to which the sensor is fixed, that fully covers the sensor when viewed from the first motor and fully covers the sensor when viewed from the second motor. The mowing robot may further include a battery which supplies power to the first motor and the second motor, and the sensor is disposed in an upper side of a virtual battery upper end plane which is in contact with an upper end of the battery and is horizontally disposed, and the cover fully covers the sensor when viewed from the battery. The cover may fully cover the sensor when viewed from below.

The mowing robot may further include a main board which is provided at an upper side of the first motor and the second motor, disposed in a lower side of the cover, fully covers the sensor when viewed from below, and controls a driving of the first motor and the second motor.

The mowing robot may further include a covering supporting unit which fixes the cover to the main board while spacing the cover from the main board. The mowing robot may further include a module case which is disposed inside the body, and accommodates the sensor, the cover, and the main board therein; and a display module which is disposed in an upper side of the sensor, and fixed to an upper side portion of the module case. The sensor may further include an acceleration sensing function.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the present disclosure are described herein with reference to cross-section illustrations that are schematic illustrations of idealized embodiments (and intermediate structures) of the present disclosure. As such, variations from the shapes of the illustrations as a result, for example, of manufacturing techniques and/or tolerances, are to be expected. Thus, embodiments of the present disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the present disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the present disclosure, the drawings and the appended claims. In addition to variations and modifications in the component parts and/or arrangements, alternative uses will also be apparent to those skilled in the art.

What is claimed is:

1. A mowing robot comprising:
   a body that forms an outer shape and defines an internal space;
   a first wheel and a second wheel independently rotatably provided at a first lateral side and a second lateral side respectively such that the body is able to rotate and move forward with respect to ground;
   a first motor that provides a rotational force to the first wheel;
   a second motor that provides a rotational force to the second wheel; and
   a sensor provided in the internal space, the sensor having a gyro sensing function to sense at least a horizontal rotation, and a magnetic field sensing function,
   wherein a virtual wheel front end plane is vertically orientated and defined by a front end of the first wheel and a front end of the second wheel, a virtual wheel rear end plane is vertically orientated and defined by a rear end of the first wheel and a rear end of the second wheel, a virtual first motor upper end plane is horizontally orientated and defined by an upper end of the first motor, and a virtual second motor upper end plane is horizontally orientated and defined by an upper end of the second motor,
   wherein the sensor is arranged between the wheel front end plane and the wheel rear end plane, and is provided above the first motor upper end plane and the second motor upper end plane, and
   wherein the mowing robot further comprises a cover to which the sensor is fixed and that fully covers the sensor when viewed from the first motor and the second motor.

2. The mowing robot of claim 1, wherein the sensor is provided between the wheel front end plane and the wheel rear end plane and relatively closer to a virtual wheel axis plane that is vertically orientated and passes through an axis of rotation of the first and second wheels.

3. The mowing robot of claim 2, wherein the virtual wheel axis plane intersects the sensor.

4. The mowing robot of claim 1, further comprising:
   a blade provided in front of a rotational axis of the first wheel and the second wheel and is configured to be rotated;
   a blade motor which provides a rotational force to the blade; and
   a battery provided behind the rotational axis of the first wheel and the second wheel and configured to supply power to the first motor, the second motor, and the blade motor,
   wherein the sensor is provided above the rotational axis of the first and second wheels, and
   wherein the first motor, the second motor, the blade motor, and the battery are provided below the sensor.

5. The mowing robot of claim 1, further comprising:
   a blade provided in front of a rotational axis of the first wheel and the second wheel and configured to be rotated; and
   a blade motor which provides a rotational force to the blade,
   wherein the sensor is provided behind a virtual blade motor rear end plane which is defined by a rear end of the blade motor and is vertically orientated, and above a virtual blade motor upper end plane which is defined by an upper end of the blade motor and is horizontally orientated.

6. The mowing robot of claim 1, further comprising a battery provided between the wheel front end plane and the wheel rear end plane and between the first wheel and the second wheel and that provides power to the first motor and the second motor,
   wherein the sensor is provided in front of a virtual battery front end plane which is defined by a front end of the battery and is vertically orientated, and provided above a virtual battery upper end plane which is defined by an upper end of the battery and is horizontally orientated.

7. The mowing robot of claim 1, further comprising:
a blade provided in front of a rotational axis of the first wheel and the second wheel and is configured to be rotated;
a blade motor which provides a rotational force to the blade; and
a battery provided behind a rotational axis of the first and second wheels and configured to provide power to the first motor, the second motor, and the blade motor,
wherein the sensor is provided behind a virtual blade motor rear end plane which is defined by a rear end of the blade motor and is vertically orientated, and provided in front of a virtual battery front end plane which is defined by a front end of the battery and is vertically orientated.

8. The mowing robot of claim 7, wherein the sensor is provided above a virtual blade motor upper end plane which is defined by an upper end of the blade motor and is horizontally orientated, and is provided above a virtual battery upper end plane which is defined by an upper end of the battery and is horizontally orientated.

9. The mowing robot of claim 8, wherein the first motor and the second motor are laterally spaced apart in a horizontal width direction, and
wherein the sensor is provided between the first and second motors in the horizontal width direction.

10. The mowing robot of claim 1, further comprising a battery which supplies power to the first motor and the second motor, wherein the sensor is provided above a virtual battery upper end plane which is defined by an upper end of the battery and is horizontally orientated, and wherein the cover fully covers the sensor when viewed from the battery.

11. The mowing robot of claim 1, wherein the cover fully covers the sensor when viewed from below.

12. The mowing robot of claim 11, further comprising a main board that is provided above the first motor and the second motor and below the cover, fully covers the sensor when viewed from below, and controls an operation of the first motor and the second motor.

13. The mowing robot of claim 12, further comprising a cover support that fixes the cover to the main board while spacing the cover from the main board.

14. The mowing robot of claim 12, further comprising:
a module case provided inside the body and that accommodates the sensor, the cover, and the main board therein; and
a display provided above the sensor and fixed to an upper side portion of the module case.

15. The mowing robot of claim 1, wherein the sensor is further capable of sensing acceleration.

16. A mowing robot comprising:
a body that forms an outer shape and defines an internal space;
a first wheel provided at a first side of the body and a second wheel provided at a second side of the body, the first wheels being configured to rotate independently so that the body can rotate and move forward with respect to ground;
a first motor that provides a rotational force to the first wheel;
a second motor that provides a rotational force to the second wheel; and
a sensor provided in the internal space, having a gyro sensing function for at least horizontal rotation, and having a magnetic field sensing function,
wherein the sensor vertically overlaps with an area between the first wheel and the second wheel, and is provided higher than the first motor and the second motor, and
wherein the mowing robot further comprises a cover to which the sensor is fixed and that fully covers the sensor when viewed from the first motor and the second motor.

17. The mowing robot of claim 16, wherein when viewed from above, the sensor is provided closer to a rotational axis of the first and second wheels than a leading edge of the first or second wheel or a trailing edge of the first or second wheel.

18. The mowing robot of claim 17, wherein when viewed from above, the sensor crosses the rotational axis of the first and second wheels.

19. The mowing robot of claim 16, further comprising:
a blade provided in front of a rotational axis of the first wheel and the second wheel and is configured to be rotated;
a blade motor which provides a rotational force to the blade; and
a battery which is provided behind the rotational axis of the first wheel and the second wheel and provides power to the first motor, the second motor, and the blade motor,
wherein the sensor is provided above the first motor, the second motor, the blade motor, and the battery.

20. The mowing robot of claim 16, further comprising:
a board that controls an operation of the first motor and the second motor, the board being positioned above the first motor and the second motor and below the cover and to cover the sensor when viewed from below.

* * * * *